United States Patent
Kobayashi

Patent Number: 5,924,700
Date of Patent: *Jul. 20, 1999

[54] GASKET

[75] Inventor: Jun Kobayashi, Fukushima, Japan

[73] Assignees: Nok Corporation, Tokyo, Japan; Toyota Jidosha Kabushiki Kaisha, Toyota, Japan

[*] Notice: This patent is subject to a terminal disclaimer.

[21] Appl. No.: 08/887,843

[22] Filed: Jul. 3, 1997

Related U.S. Application Data

[63] Continuation of application No. 08/614,137, Mar. 12, 1996, Pat. No. 5,725,222.

[51] Int. Cl.$^6$ ..................................................... F16J 15/08
[52] U.S. Cl. ........................................... 277/595; 277/594
[58] Field of Search ................................... 277/594, 595, 277/600, 601

[56] References Cited

U.S. PATENT DOCUMENTS

| | | | |
|---|---|---|---|
| 5,240,261 | 8/1993 | Udagawa et al. | 277/595 |
| 5,277,434 | 1/1994 | Kestly et al. | 277/235 B |
| 5,280,928 | 1/1994 | Ueta et al. | 277/180 |

FOREIGN PATENT DOCUMENTS

| | | | |
|---|---|---|---|
| 0330126 | 8/1989 | European Pat. Off. | 277/235 B |
| 0518665 | 12/1992 | European Pat. Off. | 277/235 B |
| 0255250 | 11/1986 | Japan | 277/235 B |
| 4-64778 | 2/1992 | Japan. | |
| 5-57514 | 7/1993 | Japan. | |

*Primary Examiner*—Daniel G. DePumpo
*Attorney, Agent, or Firm*—Jacobson, Price, Holman & Stern, PLLC

[57] ABSTRACT

A gasket having a bore (2), a base plate (1) having a flat reference plane (1a), and a stepwise half bead structure integrally formed at least on one side of the flat reference plane (1a) of the base plate (1), wherein the half bead structure has half beads (4A, 4B) of two or more steps.

3 Claims, 6 Drawing Sheets

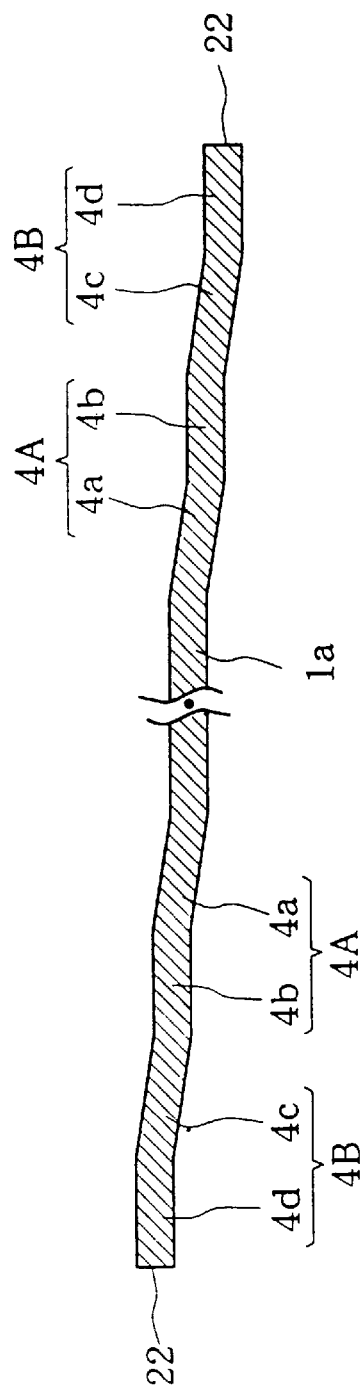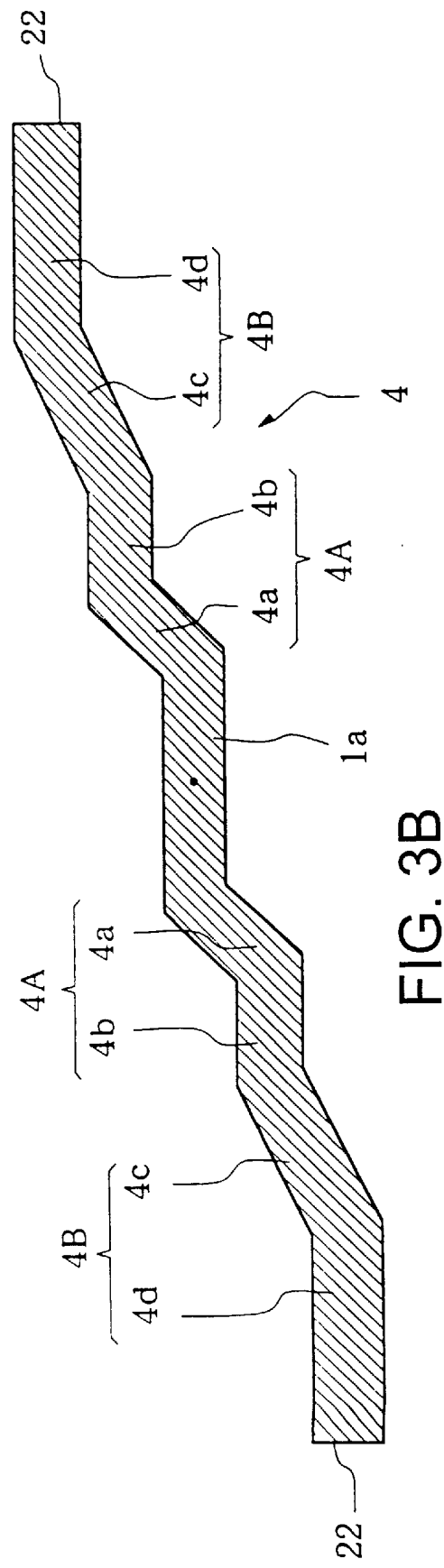

GASKET

BACKGROUND OF THE INVENTION

This is a continuing application of application Ser. No. 08/614,137, filed Mar. 12, 1996, now U.S. Pat. No. 5,725, 222.

The present invention relates to a gasket, which is one of sealing devices.

As shown in FIGS. 4 through 6, a conventional gasket has a base plate 21 made of a steel sheet. As disclosed in Japanese Patent Laid-open No. Hei 4-64778, the base plate 21 is integrally formed on the outer periphery thereof with a stepwise half bead 23. Also, a plurality of bores 22 provided in the base plate 21 are each integrally formed on the inner periphery thereof with a stepwise half bead 24.

The half beads 23 and 24 each have a slope portion 24a tilting at a predetermined angle relative to the base plate 21 and a planar portion 24b generally parallel to the base plate 21.

In this gasket, one of the half beads provided on the two adjacent bores 22 on the inner peripheries thereof (namely, the half bead 24 on the left side in FIG. 5 or 6) is formed in a projecting manner in one direction (namely, on the lower side in FIG. 5 or 6) along the thickness of the base plate 21, while the other (namely, the half bead 24 on the right side in FIG. 5 or 6) is formed in a projecting manner in the other direction (namely, on the upper side in FIG. 5 or 6) along the thickness of the base plate 21. That is, the two half beads 24 are arranged in opposite directions.

Another conventional gasket disclosed in Japanese Utility Model Laid-open No. Hei 5-57514 has a base plate 41 made of steel sheet as shown in FIGS. 7 and 8. The base plate 41 is integrally formed at the external periphery thereof with a half bead 43. A bore 42 provided in the base plate 41 is integrally formed at the inner periphery thereof with a half bead 44. The half beads 43 and 44 have slope portions 43a and 44a tilting at predetermined angles relative to the base plate 41 and planar portions 43b and 44b generally parallel to the base plate 41 respectively. In this example, the half beads 43 and 44 are both arranged in the same direction (namely, on the upper side in FIG. 8) along the thickness of the base plate 21.

The above-mentioned two gaskets are used as cylinder head gaskets for example between two mounting members (for example, an engine block and a cylinder head). When mounted, the gaskets are tightly fastened so that the tilt angles of the slope portions 24a, 43a, and 44a of the half beads 23, 24, 43, and 44 are almost removed. Hence, when the gaskets are dismantled, the tilt angles of the slope portions 24a, 43a, and 44a do not fully recover to the original angles and become narrower, consequently. As a result, the half beads 23, 24, 43, and 44 are plastically deformed by an amount of the insufficient recovery. Therefore, if any of the mounting members are subjected to deformation (thermal deformation for example) with the gaskets mounted, the half beads 23, 24, 43, and 44 cannot fully follow the deformation. This sometimes results in poor sealing.

SUMMARY OF THE INVENTION

It is therefore an object of the present invention to provide a gasket that is significantly enhanced in the follow-up properties of half beads to the deformation of mounted members, thereby providing excellent sealing.

In carrying out the invention and according to one aspect thereof, there is provided a gasket having a base plate integrally formed with a stepwise half bead, the gasket thus formed being used between a plurality of mounting members. The half bead is provided on the base plate at both or one side of the reference plane thereof in two or more steps continuously.

In the gasket according to the present invention, the half bead is provided on the base plate at both or one side of the reference plane thereof in two or more steps continuously, so that the total height of the half bead formed by the plurality of steps can be easily set to the height higher than that of the conventional half bead formed by only one step. This enhanced height of the half bead significantly improves the follow-up properties of the novel gasket to the deformation of mounted members.

Further, if only the enhancement of the follow-up properties of the half bead is taken into consideration, it is achieved by extending the slope portion of one half bead along the length of the cross section thereof. However, this increases the height of the half bead but, because the base of the slope section remains at one position, stress concentrates there. This subjects the half bead to a large plastic deformation.

According to the gasket of the present invention, stress is distributed according to the number of steps of the half bead, namely it is distributed over two positions if the number of steps is two, resulting in a smaller plastic deformation of the half bead in its entirety than that produced by the conventional gaskets.

Consequently, according to the gasket of the present invention, even if the height of the overall bead formed by a plurality of steps is set to the same level as that of the conventional half bead formed by only one step, the amount of plastic deformation is reduced as compared with the conventional half bead, thereby enhancing the follow-up properties of the novel half bead by the amount of the reduction.

From this point of view, the gasket according to the present invention can be expressed as having the half bead provided with one or more planar portions halfway on one slope portion of the half bead.

BRIEF DESCRIPTION OF THE DRAWINGS

FIG. 2B is an enlarged sectional view taken along the line 2B—2B of FIG. 1;

FIG. 3B is a sectional view of the gasket of FIG. 3A, showing a main portion corresponding to FIG. 2B.

DETAILED DESCRIPTION OF PREFERRED EMBODIMENTS

This invention will be described in further detail by way of example with reference to the accompanying drawings.

Figure 1:
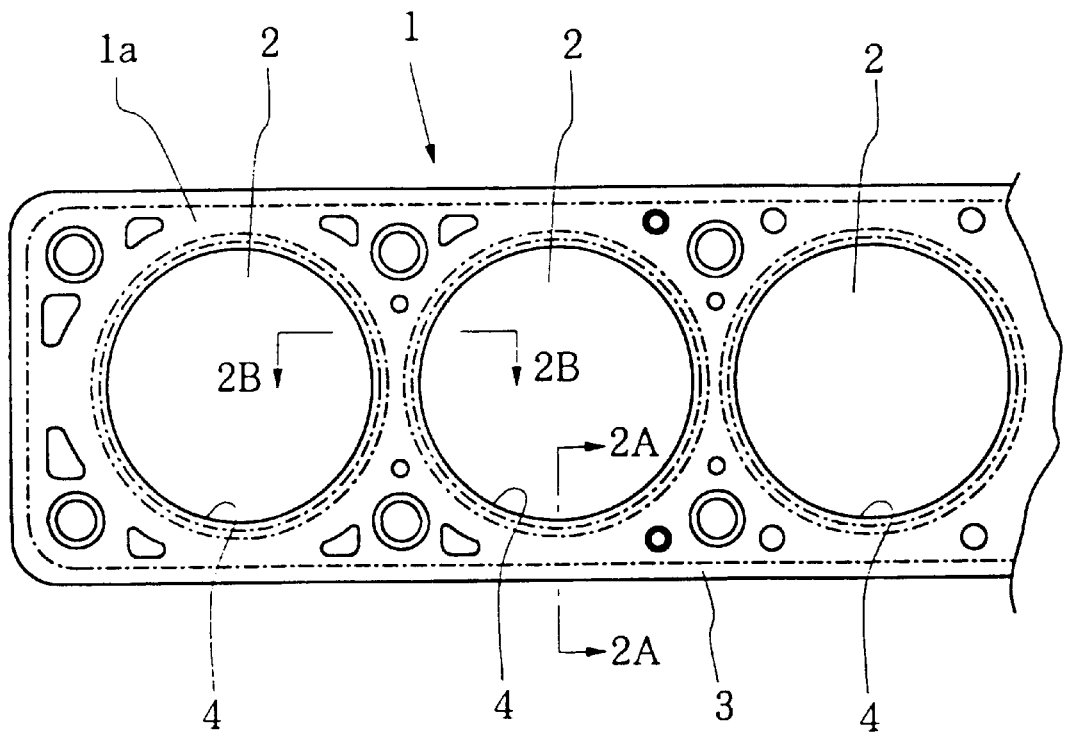
FIG. 1 is a partial top view of a gasket practiced as one preferred embodiment of the present invention.

Now, referring to FIG. 1, the gasket practiced as one preferred embodiment of the present invention has a base plate 1 made of a steel sheet. The base plate 1 is integrally formed at the outer periphery thereof with a bi-stepwise half bead 3. A plurality of bores 2 provided in the base plate 1 are also each integrally formed at the inner periphery thereof with a bi-stepwise half bead 4. Of these half beads 3 and 4, the half bead 4 provided on the inner periphery of each of the plurality of bores 2 has a multiple-step structure (in the present embodiment, the structure has two steps) according to the present invention.

Figure 2A:
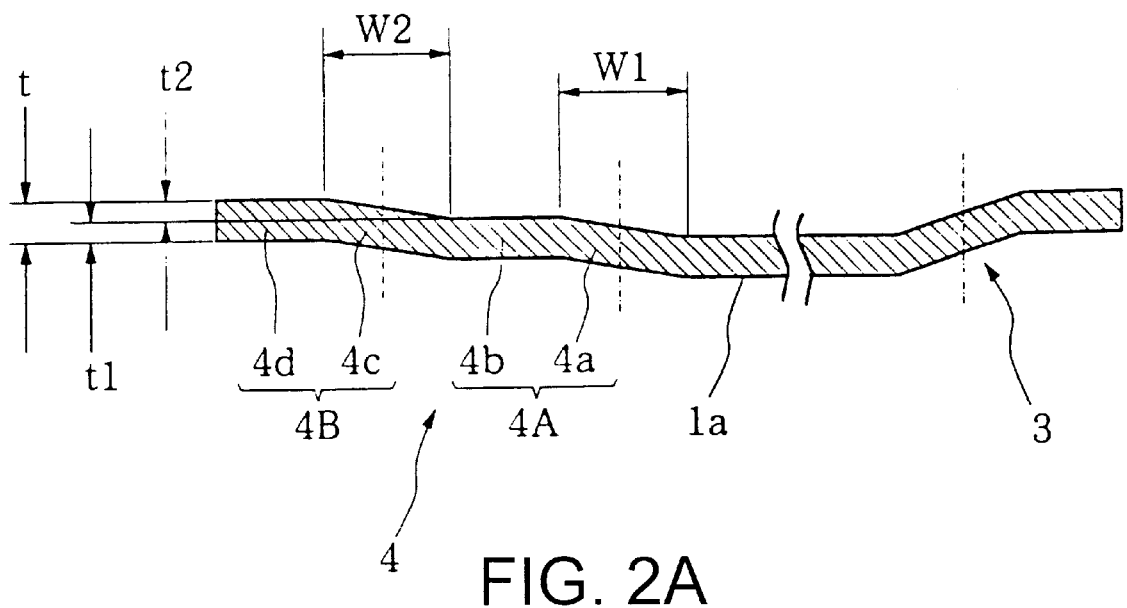
FIG. 2A is an enlarged sectional view taken along the line 2A—2A of FIG. 1.

Referring to FIG. 2A, as shown in the enlarged cross section taken along the line 2A—2A of FIG. 1, a first-step half bead 4A, shown to the left side of the reference plane 1a, composed of a slope portion 4a and a planar portion 4b is formed in a projecting manner toward one side (on the upper side of the figure) along the thickness of the base plate 1. In succession to the first-step half bead 4A, a second-step half bead 4B composed of a slope portion 4c and a planar portion 4d is formed in a projecting manner toward the same side (on the upper side of the figure). The half bead 3, provided on the base plate 1 on the outer periphery thereof, has a single-step structure. These half beads 3 and 4 are both arranged on the base plate 1 at the same side (on the upper side in FIG. 2) along the thickness of the base plate 1.

In FIGS. 1 and 2, each of alternate long and short dash lines indicates the center line of the half bead 3.

In the present embodiment, the half beads 4A and 4B are arranged in two steps continuously on one side (on the upper side in the figure) along the thickness of the base plate 1 as mentioned above, so that a total height t obtained by adding up the heights (t1 and t2) of the half beads 4A and 4B can be set with ease to a higher level than a conventional single-step half bead. Consequently, the total height t of the two half beads 4A and 4B becomes greater than each separate height (t1 and t2) in the prior art. This enhances the follow-up properties of the half beads to the deformation of mounting members by the amount of the difference between the heights.

Further, the stress produced when the gasket is mounted is distributed over the two steps, resulting in less plastic deformation than that found in conventional counterpart. Therefore, even if the total height t of the half beads 4A and 4B of two steps is set to the same height of one half bead (t1 or t2) in the prior art, the follow-up properties of the half beads can still be enhance. Consequently, the follow-up properties of the half beads 4A and 4B to the deformation of mounting members can be enhanced. This also enhances the sealing performance of the gasket.

It should be noted that, in the above-mentioned embodiment, the first-step half bead 4A and the second-step half bead 4B are made equal in the heights t1 and t2 and the lengths w1 and w2 of the slope portions 4a and 4c respectively as shown in FIG. 2.

Figure 3A:
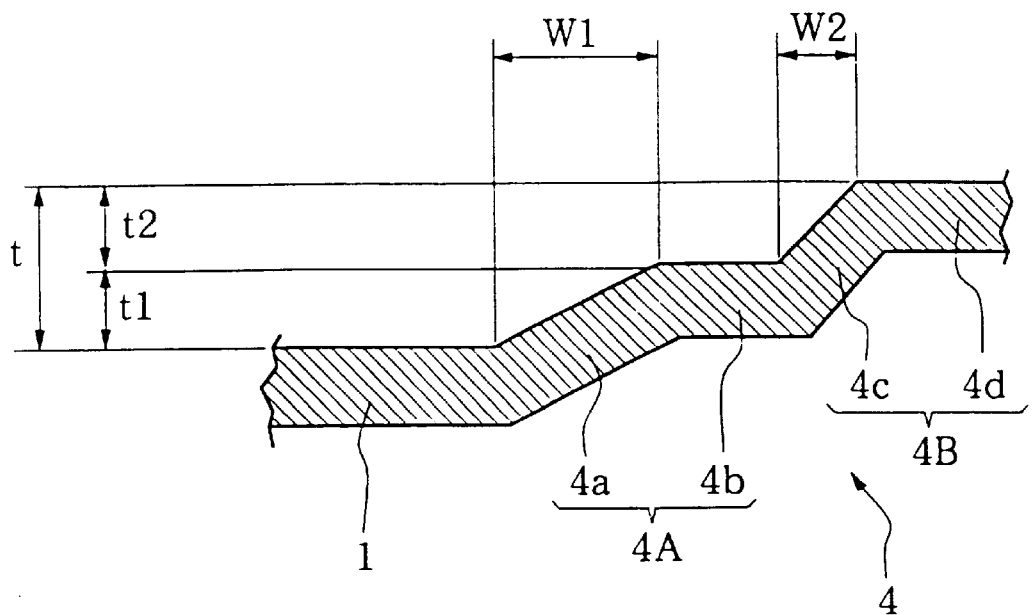
FIG. 3A is a sectional view of a gasket according to another preferred embodiment of the present invention, showing a main portion corresponding to FIG. 2A.
Figure 4:
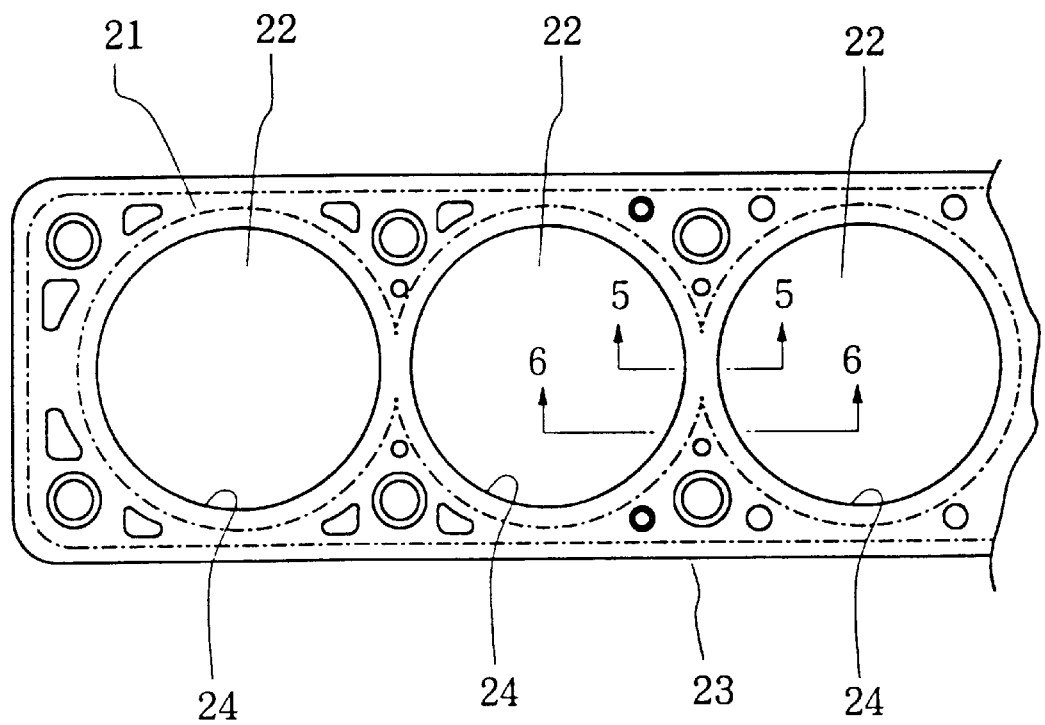
FIG. 4 is a partial top view of a conventional gasket.
Figure 5:
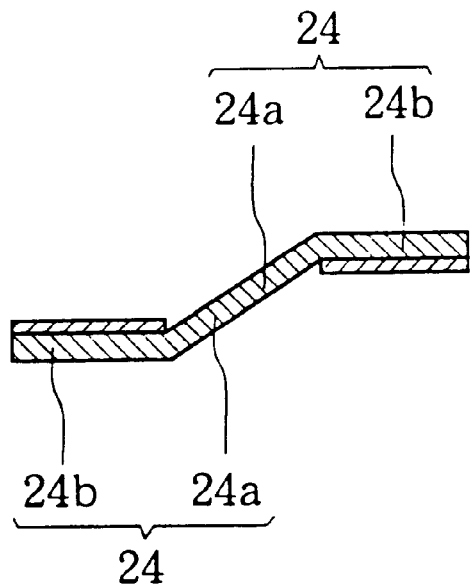
FIG. 5 is an enlarged sectional view taken along the line 5—5 of FIG. 4.
Figure 6:
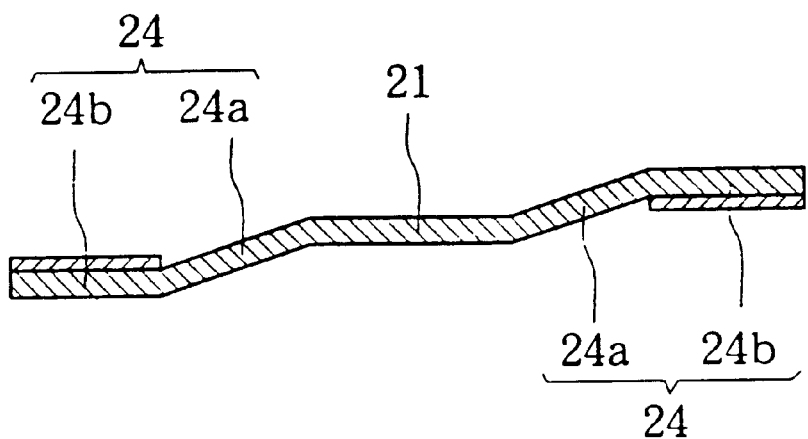
FIG. 6 is an enlarged sectional view taken along the line 6—6 of FIG. 4.
Figure 7:
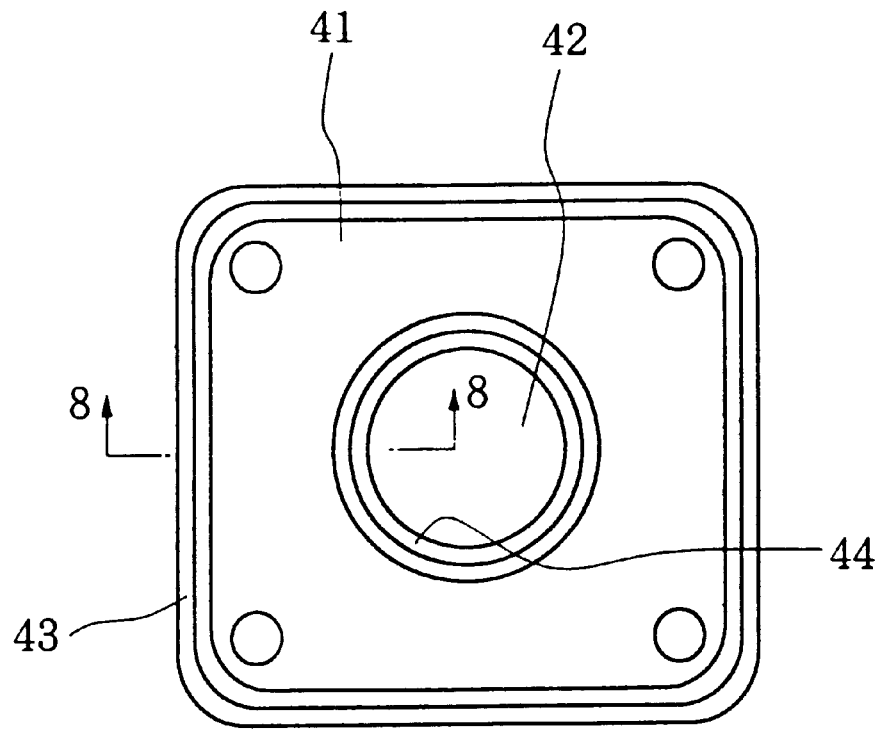
FIG. 7 is a top view of another conventional gasket.
Figure 8:
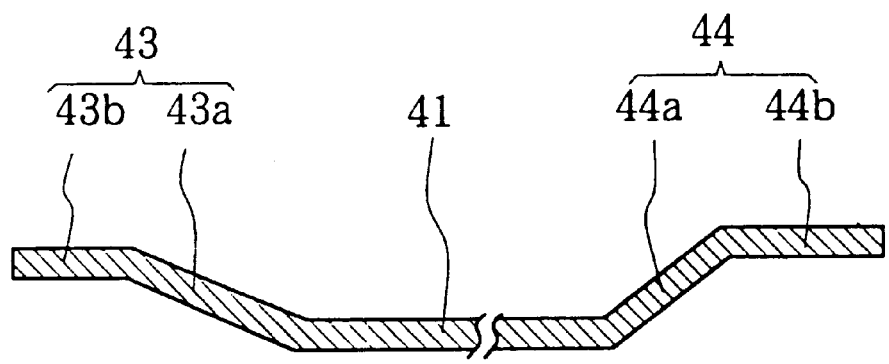
FIG. 8 is an enlarged sectional view taken along the line 8—8 of FIG. 7.

However, as shown in FIG. 3A, the heights t1 and t2 and the lengths w1 and w2 may be made different from each other, respectively, with respect to the half beads 4A and 4B. In this case, as the ratio of the lengths w1 and w2 to the heights t1 and t2 (namely, t1/w1 and t2/w2) gets smaller, the rigidity of the half beads 4A and 4B gets lower. Conversely, as this ratio gets larger, the rigidity gets higher. Hence, the half bead having the smaller ratio may be used for lower surface pressure, while the half bead having the larger ratio may be used for higher surface pressure. Thus, the bead specifications corresponding to a wide range of surface pressures may be implemented.

Figure 2C:
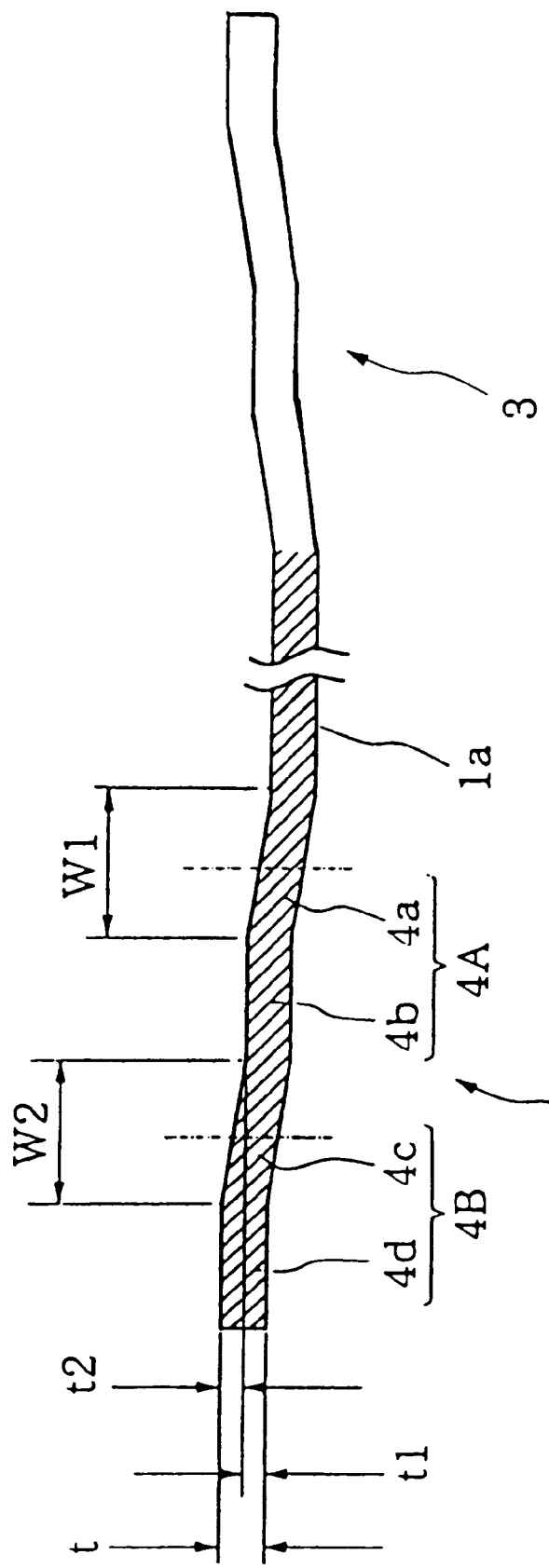
FIG. 2C is an enlarged sectional view of an alternate embodiment taken along the line 2A—2A of FIG. 1.

In the above-mentioned embodiment, only the half bead 4 arranged on the inner periphery of the bore 2 is provided with the multiple-step structure. In addition to or instead of the half bead 4, the half bead 3 provided on the outer periphery of the base plate 1 may be provided with the multiple-step structure as shown in FIG. 2C.

Generally, provision of the multiple-step structure is determined by the degree of sealing required. Half beads requiring high-degree sealing is provided with the multiple-step structure. And, there is no limitation to the number of steps formed. There is no limitation to the planar layout form of half beads, either.

It will be apparent to those skilled in the art that the present invention is significantly advantageous when applied to internal combustion engines. For example, inserting the gasket of the present invention between a cylinder block and a cylinder head, typical gasket mounting members, results in excellent sealing around the combustion chamber. Perfect sealing on this portion leads to the fullest utilization of combustion gas inside the combustion chamber.

If a gasket base plate has elasticity, the repulsive force of the bead produced when the gasket is bolted provides sealing around the combustion chamber. At the same time, fatigue failure of the bead is prevented.

Especially, in the gasket according to the present invention, continuous provision of half beads in multiple steps in one direction along the thickness of the base plate at least on one side of the reference plane facilitates the setting of the total height of the half beads of multiple steps to the height higher than that of a conventional bead of only one step. Further, in the novel gasket, the stress produced when the same is mounted is deconcentrated over multiple steps, thereby making the gasket less deformable plastically. Hence, even if the total height of the half beads of multiple steps is made equal to the height of a conventional half bead of only one step, the follow-up properties of the novel beads can still be enhanced. Therefore, the half bead follow-up properties to the deformation of mounting members can be enhanced by the novel constitution. This results in excellent sealing.

What is claimed is:

1. A gasket comprising a base plate having a gasket periphery, a bore positioned in the gasket periphery, a flat reference plane, a half bead structure integrally formed at least on one side of said flat reference plane of said base plate, at least around one of the gasket periphery and said bore, wherein said half bead structure has plural half beads each comprising a first slope portion, a first planar portion, a second slope portion and a second planar portion in order, the first and second planar portions being parallel to said reference plane, and wherein said plural half beads of each of said structure are arranged in a contiguous plural steps manner so as to be movable.

2. A gasket according to claim 1, wherein heights of said half beads are equal to each other and lengths of the slope portions are equal to each other.

3. A gasket according to claim 1, wherein heights of said half beads are different from each other and lengths of said slope portions are different from each other.

* * * * *